United States Patent
Chen et al.

(10) Patent No.: US 11,310,675 B2
(45) Date of Patent: Apr. 19, 2022

(54) UPLINK SIGNAL TRANSMISSION METHOD AND APPARATUS, UPLINK SIGNAL RECEPTION METHOD AND APPARATUS AND SYSTEM

(71) Applicant: FUJITSU LIMITED, Kawasaki (JP)

(72) Inventors: Zhe Chen, Beijing (CN); Xin Wang, Beijing (CN); Lei Zhang, Beijing (CN); Lei Song, Beijing (CN); Guoyu Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/896,639

(22) Filed: Jun. 9, 2020

(65) Prior Publication Data

US 2020/0305007 A1   Sep. 24, 2020

Related U.S. Application Data

(63) Continuation of application No. PCT/CN2018/072297, filed on Jan. 11, 2018.

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04W 36/08* (2013.01);
(Continued)

(58) Field of Classification Search
CPC ... H04W 16/28; H04W 36/08; H04W 56/001; H04W 72/005; H04W 72/0493; H04B 7/0695
See application file for complete search history.

(56) References Cited

U.S. PATENT DOCUMENTS

| | | | |
|---|---|---|---|
| 2013/0156220 A1 | 6/2013 | Bar-Zeev et al. | |
| 2018/0006770 A1 | 1/2018 | Guo et al. | |

(Continued)

FOREIGN PATENT DOCUMENTS

| | | |
|---|---|---|
| GN | 103036691 A | 4/2013 |
| WO | 2012/154955 A1 | 11/2012 |
| WO | 2013/025547 A2 | 2/2013 |

OTHER PUBLICATIONS

International Search Report issued by the State Intellectual Property Office of the P.R. China for corresponding International Patent Application No. PCT/CN2018/072297, dated Sep. 25, 2018, with an English translation.

(Continued)

*Primary Examiner* — Eric Myers
(74) *Attorney, Agent, or Firm* — Myers Wolin, LLC

(57) ABSTRACT

Uplink signal transmission method, uplink signal reception method and apparatus thereof and a system. The uplink signal transmission method includes: when a network device configures first information associated with a spatial relation for an uplink signal but the special relation for the uplink signal is not effective, a terminal equipment transmits an uplink signal by using a spatial domain transmission filter the same as that of a transmitted signal or a received signal or using a spatial domain transmission filter associated with a predetermined item in the first information. With this method, the terminal equipment may transmit an uplink signal by using a suitable spatial domain transmission filter in a case where an uplink beam is not determined according to the configuration of the network device.

15 Claims, 6 Drawing Sheets

(51) Int. Cl.
H04W 36/08 (2009.01)
H04W 56/00 (2009.01)
H04W 72/00 (2009.01)
H04W 72/04 (2009.01)

(52) U.S. Cl.
CPC ....... H04W 56/001 (2013.01); H04W 72/005 (2013.01); H04W 72/0493 (2013.01)

(56) References Cited

U.S. PATENT DOCUMENTS

2020/0396731 A1* 12/2020 Venugopal ............ H04L 5/0048
2021/0167930 A1* 6/2021 Jeon .................... H04L 27/2607

OTHER PUBLICATIONS

NTT Docomo, Inc., "Email Discussions on UL Transmission Procedures", Agenda Item: 7.3.3.4, 3GPP TSG-RAN WG1 Meeting #90bis, R1-1718814, Prague, CZ, Oct. 9-13, 2017.
"List of RAN1 Agreements", RP-172461, RAN1 NR-Adhoc#3 (Sep. 2017), p. 140.
Extended European Search Report issued by the European Patent Office for corresponding European Patent Application No. 18900236.3, dated Nov. 30, 2020.
Qualcomm, "Summary of Beam Management", Agenda Item: 7.2.2.3, 3GPP TSG RAN WG1 Meeting #91, R1-1721696, Nov. 27-Dec. 1, 2017, Reno, USA.
Oppo, "Discussion on Remaining Issues of QCL", Agenda Item: 7.2.3.7, 3GPP TSG RAN WG1 Meeting #91, R1-1719990, Nov. 27-Dec. 1, 2017, Reno, USA.
Notice of Preliminary Rejection issued by the Korean Intellectual Property Office for corresponding Korean Patent Application No. 10-2020-7016789, dated Nov. 10, 2021, with an English translation.
Lenovo et al., "Random access for beam failure recovery", Agenda Item: 10.2.10, 3GPP TSG-RAN WG2 Meeting #99, R2-1709073, Berlin, Germany, Aug. 21-25, 2017.
Mediatek, Inc. "Further Details on Beam Failure Recovery", Agenda Item: 7.2 2.4, 3GPP TSG-RAN WG1 Meeting #91, R1-1719566, Reno, USA, Nov. 27-Dec. 1, 2017.
Notice of Reasons for Refusal issued by the Japan Patent Office for corresponding Japanese Patent Application No. 2020-531776, dated Aug. 31, 2021, with an English translation.
Samsung, "On Beam Management, Measurement and Reporting", Agenda Item: 7.2.2.3, 3GPP TSG-RAN WG1 Meeting #91, R1-1720290, Reno, USA, Nov. 27-Dec. 1, 2017.
Interdigital Inc., "Multiple Msg1 transmissions for one monitored RAR window", Agenda Item: 7.1.1.4.2, 3GPP TSG-RAN WG1 Meeting #89, R1-1708992, Hangzhou, P.R. China, May 15-19, 2017.
Examination Report issued by the Patent Office of India for corresponding Indian Patent Application No. 202037022863 dated Aug. 30, 2021, with an English translation.

* cited by examiner

FIG. 4

> 401
> 
> when a network device configures first information associated with a spatial relation for an uplink signal but the special relation for the uplink signal is not effective, a terminal equipment transmits an uplink signal by using a spatial domain transmission filter the same as that of a received signal or a transmitted signal or using a spatial domain transmission filter associated with a predetermined item in the first information

FIG. 5

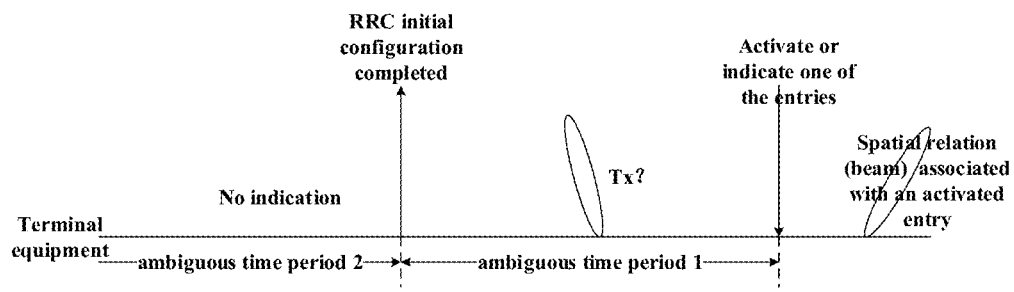

FIG. 6

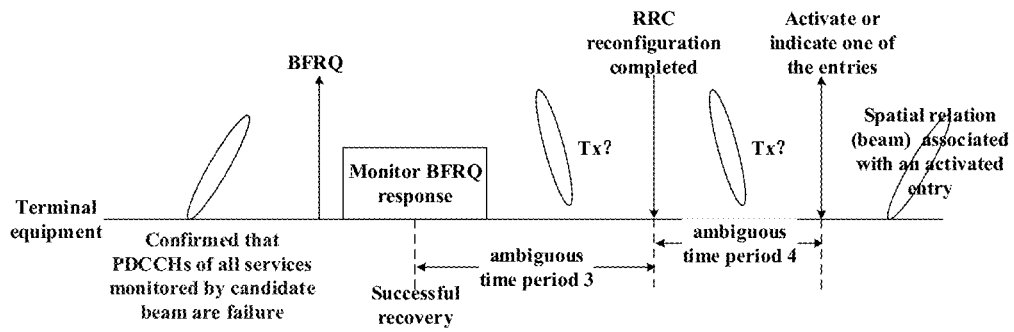

FIG. 7A

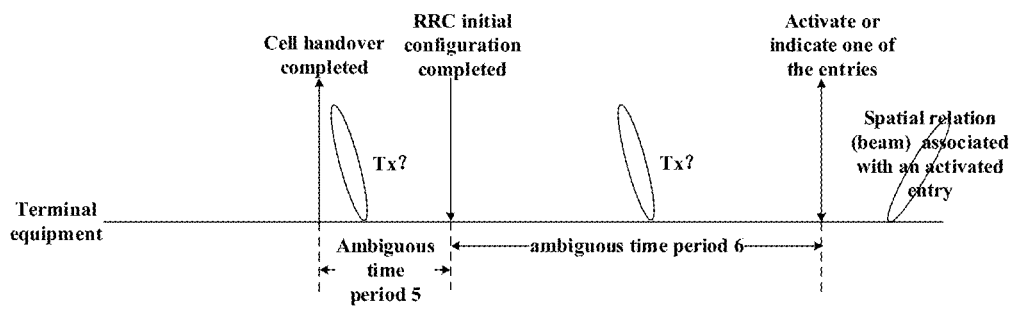

FIG. 7B

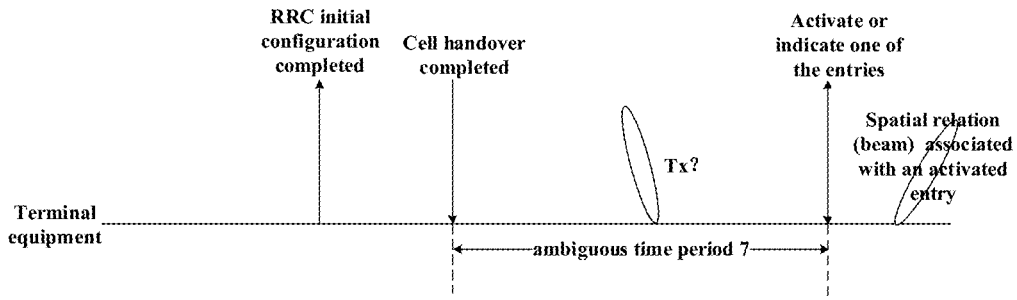

FIG. 8

801 when a network device configures a terminal equipment with first information associated with a spatial relation for an uplink signal but the special relation for the uplink signal is not effective, the network device receives an uplink signal by using a spatial domain transmission filter the same as that of a received signal or a transmitted signal or using a spatial domain transmission filter associated with a default item in the first information

FIG. 9

901 before a network device configures second information associated with a spatial relation for an uplink signal, a terminal equipment transmits an uplink signal by using a spatial domain transmission filter the same as that of a received signal or a transmitted signal, the second information including one item, the item indicating a spatial relation

FIG. 10

1001 before a network device configures a terminal equipment with second information associated with a spatial relation for an uplink signal, the network device receives an uplink signal by using a spatial domain transmission filter the same as that of a transmitted signal or a received signal, the second information including one item, the item indicating a spatial relation

UPLINK SIGNAL TRANSMISSION METHOD AND APPARATUS, UPLINK SIGNAL RECEPTION METHOD AND APPARATUS AND SYSTEM

CROSS REFERENCE TO RELATED APPLICATIONS

This application is a continuation application of International Application No. PCT/CN2018/072297, filed on Jan. 11, 2018, the contents of which are incorporated herein by reference.

FIELD

This disclosure relates to the field of communications, and in particular to an uplink signal transmission method and apparatus, an uplink signal reception method and apparatus and a system.

BACKGROUND

In order to promote the progress of 3rd Generation Partnership Project 5th Generation (3GPP 5G) standards, several meetings related to these standards were held. In the recent RAN1 #91 meeting, a beam indication mechanism for an uplink control channel (PUCCH) was determined. A spatial relation for PUCCH resource(s) is determined by a parameter PUCCH-Spatial-relation-info configured by radio resource control (RRC) signaling, wherein, PUCCH-Spatial-relation-info is a list that contains one or more items, and each item can be a synchronization Signal/PBCH block identifier (SSB ID), or channel state information reference signal (CSI-RS) resource indication (SRI), or sounding reference signal resource indication (SRI) to indicate the spatial relation for the PUCCH(s). If multiple items are configured in PUCCH-Spatial-relation-info, a media access control—control element (MAC-CE) signal indication is needed to associate the spatial relation for the PUCCH(s) with one of the items therein, and a terminal equipment may transmit uplink signals according to the spatial relation for the PUCCH(s) associated with an item indicated by the MAC CE; if PUCCH-Spatial-relation-info contains only one item, the terminal equipment will directly apply configuration therein, the MAC CE signal is not needed to activate the operation.

FIGS. 1a and 1b show cases where the PUCCH-Spatial-relation-info contains multiple items and one item, respectively. As shown in FIG. 1a, in the case where PUCCH-Spatial-relation-info contains multiple items (RS1~RS4), each item may have an index and indicates a spatial relation; for example, RS1 indicates Tx1, RS2 indicates Tx2, RS3 indicates Tx3, and RS4 indicates Tx4; wherein RS1~RS4 may be SSB IDs, CRIs, or SRIs. In this configuration, the network device activates or indicates one of the items via the MAC CE, such as activating or indicating RS2. Thus, the terminal equipment may transmit an uplink signal by applying the spatial relation Tx2 indicated by RS2. As shown in FIG. 1b, in the case where PUCCH-Spatial-relation-info contains an item (RS1), the network device does not need to perform other configuration, and the terminal equipment may directly apply the spatial relation Tx3 indicated by the item RS1 to transmit an uplink signal.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when the network device configures PUCCH-Spatial-relation-info for the terminal equipment and PUCCH-Spatial-relation-info contains multiple items, as shown in FIG. 1a, during a process from the network device configures PUCCH-Spatial-relation-info for the terminal equipment (RRC configuration completion) to the MAC CE signal activates or indicates one of the items, indication of uplink beams of the terminal equipment by the network device is ambiguous. As shown in FIG. 2, in such a case, the terminal equipment does not know which beam is used for transmission. And furthermore, when the network device does not configure PUCCH-Spatial-relation-info for the terminal equipment, it is possible that the terminal equipment does not know which beam is used for transmission.

In order to solve at least one of the above problems or other similar problems, embodiments of this disclosure provide an uplink signal transmission method, an uplink signal reception method, an apparatus thereof and a system.

According to a first aspect of the embodiments of this disclosure, there is provided an uplink signal transmission method, wherein the method includes:

when a network device configures first information associated with a spatial relation for an uplink signal but the special relation for the uplink signal is not effective, a terminal equipment transmits an uplink signal by using a spatial domain transmission filter the same as that of a received signal or a transmitted signal or using a spatial domain transmission filter associated with a predetermined item in the first information.

According to a second aspect of the embodiments of this disclosure, there is provided an uplink signal reception method, wherein the method includes:

when a network device configures a terminal equipment with first information associated with a spatial relation for an uplink signal but the special relation for the uplink signal is not effective, the network device receives an uplink signal by using a spatial domain transmission filter the same as that of a received signal or a transmitted signal or using a spatial domain transmission filter associated with a default item in the first information.

According to a third aspect of the embodiments of this disclosure, there is provided an uplink signal transmission method, wherein the method includes:

before a network device configures second information associated with a spatial relation for an uplink signal, a terminal equipment transmits an uplink signal by using a spatial domain transmission filter the same as that of a received signal or a transmitted signal, wherein, the second information includes one item, and the item indicates a spatial relation.

According to a fourth aspect of the embodiments of this disclosure, there is provided an uplink signal reception method, wherein the method includes:

a network device configures second information for a terminal equipment, wherein, the second information includes one item, and the item indicates a spatial relation; and the network device receives an uplink signal before the configuration by using a spatial domain transmission filter the same as that of a received signal or a transmitted signal.

According to a fifth aspect of the embodiments of this disclosure, there is provided an uplink signal transmission apparatus, configured in a terminal equipment, the apparatus including:

a transmitting unit configured to, when a network device configures first information associated with a spatial relation for an uplink signal but the special relation for the uplink signal is not effective, transmit an uplink signal by using a spatial domain transmission filter the same as that of a received signal or a transmitted signal or using a spatial domain transmission filter associated with a predetermined item in the first information.

According to a sixth aspect of the embodiments of this disclosure, there is provided an uplink signal reception apparatus, configured in a network device, the apparatus including:

a receiving unit configured to, when the network device configures a terminal equipment with first information associated with a spatial relation for an uplink signal but the special relation for the uplink signal is not effective, receive an uplink signal by using a spatial domain transmission filter the same as that of a received signal or a transmitted signal or using a spatial domain transmission filter associated with a default item in the first information.

According to a seventh aspect of the embodiments of this disclosure, there is provided an uplink signal transmission apparatus, configured in a terminal equipment, the apparatus including:

a transmitting unit configured to, before a network device configures second information associated with a spatial relation for an uplink signal, transmit an uplink signal by using a spatial domain transmission filter the same as that of a received signal or a transmitted signal, wherein, the second information includes one item, and the item indicates a spatial relation.

According to an eighth aspect of the embodiments of this disclosure, there is provided an uplink signal reception apparatus, configured in a network device, the apparatus including:

a configuring unit configured to configure a terminal equipment with second information associated with a spatial relation for an uplink signal, wherein, the second information includes one item, and the item indicates a spatial relation; and a receiving unit configured to receive an uplink signal before the configuration by using a spatial domain transmission filter the same as that of a received signal or a transmitted signal.

According to a ninth aspect of the embodiments of this disclosure, there is provided a network device, including the apparatus as described in the sixth or eighth aspect.

According to a tenth aspect of the embodiments of this disclosure, there is provided a terminal equipment, including the apparatus as described in the fifth or seventh aspect.

According to an eleventh aspect of the embodiments of this disclosure, there is provided a communication system, including the terminal equipment as described in the tenth aspect and the network device as described in the ninth aspect.

According to another aspect of the embodiments of this disclosure, there is provided a computer readable program, which, when executed in a network device, will cause a computer to carry out the method as described in the second or the fourth aspect in the network device.

According to a further aspect of the embodiments of this disclosure, there is provided a storage medium storing a computer readable program, the computer readable program will cause a computer to carry out the method as described in the second or the fourth aspect in a network device.

According to yet another aspect of the embodiments of this disclosure, there is provided a computer readable program, which, when executed in a terminal equipment, will cause a computer to carry out the method as described in the first or the third aspect in the terminal equipment.

According to still another aspect of the embodiments of this disclosure, there is provided a storage medium storing a computer readable program, the computer readable program will cause a computer to carry out the method as described in the first or the third aspect in a terminal equipment.

An advantage of the embodiments of this disclosure exists in that with the embodiments of this disclosure, the terminal equipment may transmit an uplink signal by using a suitable spatial domain transmission filter in a case where an uplink beam is not determined according to the configuration of the network device, thereby solving the problem that a terminal equipment is unable to transmit an uplink signal in a case where an uplink beam is not determined.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 4 is a schematic diagram of the uplink signal transmission method of Embodiment 1;

FIG. 5 is a schematic diagram of a scenario of configuring first information;

FIG. 6 is a schematic diagram of another scenario of configuring first information;

FIG. 7A is a schematic diagram of a further scenario of configuring first information;

FIG. 7B is a schematic diagram of yet further scenario of configuring first information;

FIG. 8 is a schematic diagram of the uplink signal reception method of Embodiment 2;

FIG. 9 is a schematic diagram of the uplink signal transmission method of Embodiment 3;

FIG. 10 is a schematic diagram of the uplink signal reception method of Embodiment 4;

DETAILED DESCRIPTION

Figures 1A, 1B:
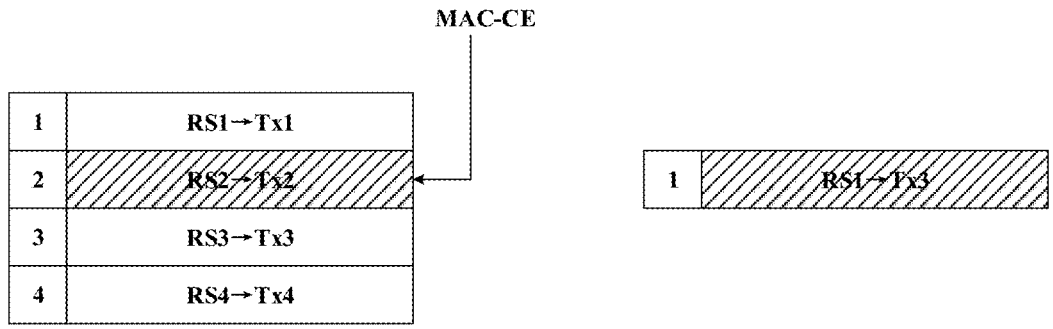
FIG. 1A and FIG. 1B are schematic diagrams of PUCCH-Spatial-relation-info.
Figure 2:
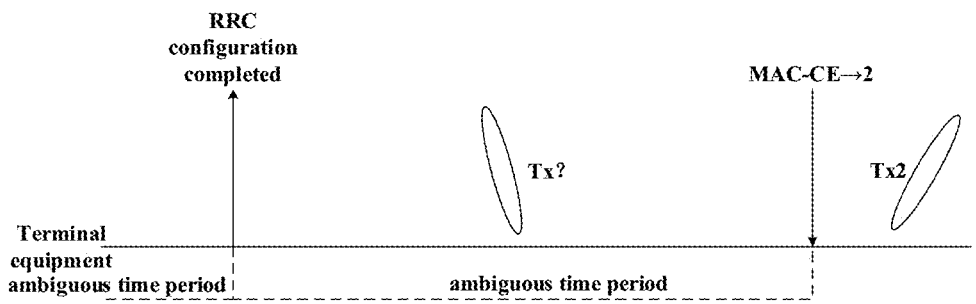
FIG. 2 is a schematic diagram of uplink beam configuration and indication or activation.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 3:
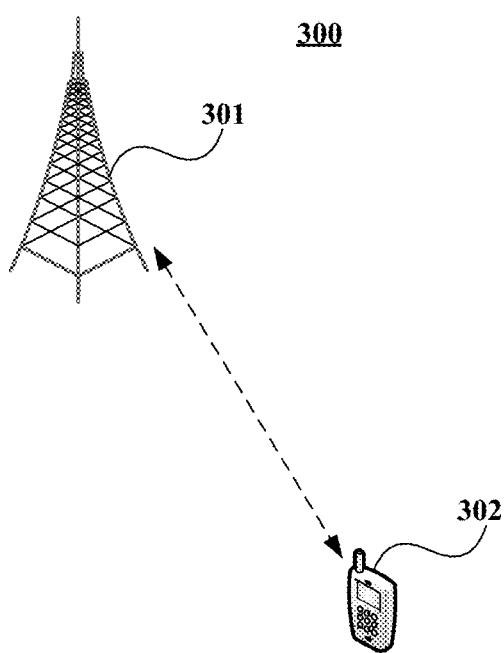
FIG. 3 is a schematic diagram of a communication system of an embodiment of this disclosure.

FIG. 3 is a schematic diagram of a communication system of an embodiment of this disclosure, in which a case where a terminal equipment and a network device are taken as examples is schematically shown. As shown in FIG. 3, a communication system 300 may include a network device 301 and a terminal equipment 302. An example having one terminal equipment is schematically given in FIG. 3. The network device 301 is, for example, a network device gNB in an NR system.

In the embodiment of this disclosure, existing traffics or traffics that may be implemented in the future may be performed between the network device 301 and the terminal equipment 302. For example, such traffics may include but not limited to an enhanced mobile broadband (eMBB), massive machine type communication (MTC), and ultra-reliable and low-latency communication (URLLC).

The terminal equipment 302 may transmit data to the network device 301, for example, in a grant-free transmission manner. The network device 301 may receive data transmitted by one or more terminal equipments 302, and feedback information (such as acknowledgement/non-acknowledgement (ACK/NACK) information) to the terminal equipment 302. The terminal equipment 302 may acknowledge the end of a transmission process according to the feedback information, or may perform new data transmission, or perform data retransmission.

Various embodiments of this disclosure shall be described below with reference to the accompanying drawings. These embodiments are exemplary only, and are not intended to limit this disclosure.

Embodiment 1

Embodiment 1 of this disclosure provides an uplink signal transmission method, applicable to a terminal equipment. FIG. 4 is a schematic diagram of the uplink signal transmission method of this embodiment. As shown in FIG. 4, the method includes:

step 401: when a network device configures first information associated with a spatial relation for an uplink signal but the special relation for the uplink signal is not effective, a terminal equipment transmits an uplink signal by using a spatial domain transmission filter the same as that of a received signal or a transmitted signal or using a spatial domain transmission filter associated with a predetermined item in the first information.

In this embodiment, the first information is, for example, the above PUCCH-Spatial-relation-info. As described above, the first information may have multiple items or may have one item, each item indicating or being associated with one spatial relation. For the convenience of description, this embodiment shall be described only for the case where the first information includes multiple items.

In this embodiment, as described in the Background, in the case where the first information includes multiple items, as an item to be used needs to be indicated or activated by the network device via an MAC CE, when the network device has not activated or indicated the item to be used, that is, when a spatial relation for the uplink signal is not effective, the terminal equipment may transmit the uplink signal by using a spatial domain transmission filter the same as that of a transmitted signal or received signal or using a spatial domain transmission filter associated with a predetermined item in the first information. Thus, the terminal equipment may transmit the uplink signal by using an appropriate spatial domain transmission filter in a case where an uplink beam is uncertain according to configuration of the network device, which solves the problem that the terminal equipment is unable to transmit an uplink signal in the case where an uplink beam is uncertain.

In other embodiments, that the spatial relation for the uplink signal is not effective may be other cases; for example, the terminal equipment does not receive the above configuration of the network device, or, although the terminal equipment receives the above configuration of the network device, it does not successfully obtain the above first information, etc., in which cases the terminal equipment may transmit the uplink signal by using a spatial domain transmission filter the same as a spatial domain transmission filter of a transmitted or received signal.

In this embodiment, the network device may configure the above first information for the terminal equipment via RRC signaling; however, this embodiment is not limited thereto, and the first information may also be configured via other signaling. For the convenience of explanation, in this embodiment, RRC signaling is taken as an example, and configuration of the first information is referred to as RRC configuration. The RRC configuration here should not be understood as configuration of RRC signaling other than the configuration of the first information.

In this embodiment, the above configuration may be initial configuration of the first information, or it may be reconfiguration of the first information after a beam failure and successful recovery of the beam failure, or it may further be initial configuration of the first information after successful cell handover. The above initial configuration refers to that the first information has not been configured for the terminal equipment before this time of configuration.

FIG. 5 is a schematic diagram of the initial configuration of the first information (PUCCH-Spatial-relation-info). As shown in FIG. 5, in this scenario, the terminal equipment may possibly have just completed an initial access procedure. Indication of the uplink beam by the network device is ambiguous in a period from completion of the initial configuration of the first information to indicating or activating one of the items therein by the network device via an MAC CE. This period is referred to as an ambiguous time period 1, and during the ambiguous time period 1, the terminal equipment may transmit the uplink signal by using a spatial domain transmission filter the same as that of a transmitted signal or received signal or using a spatial domain transmission filter associated with a predetermined item in the first information.

For example, the terminal equipment may transmit the uplink signal by using a spatial domain transmission filter the same as that of transmitting a first message (msg.1) in a random access procedure. In the scenario shown in FIG. 5, successful initial access indicates that an uplink beam of msg.1 is reliable. Using the beam of msg.1 in the above period of time (the ambiguous time period) may ensure a rate of success.

For another example, the terminal equipment may transmit the uplink signal by using a spatial domain transmission filter the same as that of transmitting a third message (msg.3) in a random access procedure. In the scenario shown in FIG. 5, similar to msg.1, successful initial access indicates that an uplink beam of msg.3 is reliable. Using the beam of msg.3 in the above period of time (the ambiguous time period) may also ensure the rate of success.

For a further example, the terminal equipment may transmit the uplink signal by using a spatial domain transmission filter associated with a predetermined item in the first information. The predetermined item may be predefined or preconfigured, for example, a first item is predefined or preconfigured. Hence, the terminal equipment may transmit the uplink signal by using a spatial domain transmission filter associated with the first item in the ambiguous time period. In this way, not only the problem that the terminal equipment is unable to determine an uplink beam in the above ambiguous time period is solved, but also signaling overhead is lowered.

For yet another example, the terminal equipment may transmit the uplink signal by using a spatial domain transmission filter associated with a default item configured in the first information. In this example, unlike the previous example, the network device may further configure a default item for the first information, and the terminal equipment may transmit the uplink signal by using a spatial domain transmission filter associated with the configured default item in the ambiguous time period. Therefore, there will be a larger range for selecting uplink beams, and the configuration of the first information will be more flexible.

For still another example, the terminal equipment may transmit the uplink signal by using a spatial domain transmission filter the same as that of receiving a broadcast signal (PBCH). In this example, principles of channel reciprocity are used, and in the presence of channel reciprocity, a corresponding uplink beam transmitted by a spatial domain transmission filter successfully receiving the PBCH is reliable, and the spatial domain transmission filter may be used by the terminal equipment, thereby ensuring the rate of success.

For yet still another example, the terminal equipment may transmit the uplink signal by using a spatial domain transmission filter the same as that of receiving a synchronization signal (SS). In this example, similar to the previous example, the principles of channel reciprocity are also used, and the same spatial domain transmission filter receiving an SS is used, thereby ensuring the rate of success.

Furthermore, in the scenario shown in FIG. 5, before the initial configuration, no indication of the spatial relation (uplink beam) of the uplink signal is performed by the network device, in which case the indication of the uplink beam by the network device is also ambiguous, which is referred to as an ambiguous time period 2, and during the ambiguous time period 2, the terminal equipment may transmit the uplink signal by using a spatial domain transmission filter the same as that of a transmitted signal or received signal.

For example, the terminal equipment may transmit the uplink signal by using a spatial domain transmission filter the same as that of transmitting the first message (msg.1) in the random access procedure. In this example, before the initial configuration, the terminal equipment did not obtain the configuration about the first information, hence, the indication of the network device about the uplink beam is also ambiguous. However, the terminal equipment may have completed the initial access at this moment. During this period of time, it may transmit the uplink signal by using the same spatial domain transmission filter transmitting msg.1. Likewise, the terminal equipment may also transmit the uplink signal by using a spatial domain transmission filter the same as that of transmitting the third message (msg.3) in the random access procedure. Alternatively, the terminal equipment may transmit the uplink signal by using a spatial domain transmission filter the same as that of receiving the broadcast signal (PBCH), or the terminal equipment may transmit the uplink signal by using a spatial domain transmission filter the same as that of receiving the synchronization signal (SS). Principles of implementation thereof are identical to what is described above, and the description of which is omitted here.

In the scenario shown in FIG. 5, the uplink signal may be an uplink control signal (PUCCH), which may be used to carry such information as ACK/NACK feedback of a downlink data channel (PDSCH), and CSI reporting. Furthermore, the uplink signal may be a sounding reference signal (SRS), or the like.

FIG. 6 is a schematic diagram of reconfiguring the first information after a beam failure and successful recovery thereof. As shown in FIG. 6, in this scenario, the terminal equipment has just successfully recovered from the beam failure, and an previous uplink beam indication (such as uplink beam indication for an uplink control signal (PUCCH) and/or an uplink data signal (PUSCH)) is already unreliable, and the uplink beam indication for the PUCCH and/or the PUSCH needs to be reconfigured and/or activated and/or indicated. Thus, from the successful recovery to reconfiguration of the first information and from the reconfiguration of the first information to activating or indicating one of the items, the uplink beam indication is ambiguous, which are referred to as an ambiguous time period 3 and an ambiguous time period 4, respectively.

In this embodiment, in the ambiguous time period 4, the terminal equipment may transmit the uplink signal by using a spatial domain transmission filter the same as that of a transmitted signal or received signal or using a spatial domain transmission filter associated with the predetermined item in the first information.

For example, the terminal equipment may transmit the uplink signal by using a spatial domain transmission filter the same as that of transmitting a beam failure recovery request. In the scenario shown in FIG. 6, the terminal equipment has just successfully recovered from the beam failure, indicating that an uplink beam of the BFRQ is reliable. Using the BFRQ beam in the ambiguous time period 4 to transmit the uplink signal can ensure the rate of success.

For another example, the terminal equipment may transmit the uplink signal by using a spatial domain transmission filter the same as that of successfully receiving a beam failure recovery response control resource set (BFR-CORESET). In this example, the principles of channel reciprocity are also used, and downlink successful reception of the BFR-CORESET may ensure transmission of the uplink signal.

In addition, the terminal equipment may transmit the uplink signal by using a spatial domain transmission filter associated with a pre-designated item in the first information, or the terminal equipment may transmit the uplink signal by using a spatial domain transmission filter associated with a default item configured in the first information, or the terminal equipment may transmit the uplink signal by using a spatial domain transmission filter the same as that of receiving the PBCH, or the terminal equipment may transmit the uplink signal by using a spatial domain transmission filter the same as that of receiving the SS. Principles of implementation thereof are identical to what is described above, and the description of which is omitted here.

In this embodiment, in the ambiguous time period 3, the terminal equipment may transmit the uplink signal by using a spatial domain transmission filter the same as that of a transmitted signal or received signal.

For example, the terminal equipment may transmit the uplink signal by using a spatial domain transmission filter the same as that of transmitting a beam failure recovery request (BFRQ), or the terminal equipment may transmit the uplink signal by using a spatial domain transmission filter the same as that of successfully receiving a beam failure recovery response control resource set (BFR-CORESET). Principles of implementation thereof are identical to what is described above, and the description of which is omitted here.

In the scenario shown in FIG. 6, since the reconfiguration of the first information occurs after the beam failure and successful recovery thereof, the uplink signal that needs to be indicated by the uplink beam may be a PUCCH, or may be a PUSCH, or may be both. Moreover, a PUCCH may carry such functions as RRC configuration response, beam training, and beam reporting, etc., and a PUSCH may carry uplink data.

FIGS. 7a and 7b are schematic diagrams of initially configuring the first information in a cell handover scenario.

In the scenario shown in FIG. 7a, success of cell handover occurs before the initial configuration of the first information, that is, the terminal equipment successfully hands over to a new cell and completes the initial configuration of the first information in the new cell. In this scenario, from completion of the cell handover to completion of the initial configuration of the first information and from the completion of the initial configuration of the first information to activating or indicating by the network device which of items therein is to be used, indication of an uplink beam by the network device is also ambiguous, which are referred to as an ambiguous time period 5 and an ambiguous time period 6, respectively.

In the ambiguous time period 5, the terminal equipment may transmit the uplink signal by using a spatial domain transmission filter the same as that of a received signal. For example, the terminal equipment may transmit the uplink signal by using the same spatial domain transmission filter as that of receiving a broadcast signal (PBCH), or the terminal equipment may transmit the uplink signal by using the same spatial domain transmission filter as that of receiving a synchronization signal (SS). Principles of implementation thereof are identical to what is described above, and the description of which is omitted here.

In the ambiguous time period 6, the terminal equipment may transmit the uplink signal by using the same spatial domain transmission filter as that of a received signal or a spatial domain transmission filter associated with a predetermined item in the first information. For example, the terminal equipment may transmit the uplink signal by using a spatial domain transmission filter associated with a pre-designated item in the first information, or the terminal equipment may transmit the uplink signal by using a spatial domain transmission filter associated with a configured default item in the first information, or the terminal equipment may transmit the uplink signal by using a spatial domain transmission filter the same as that of receiving a physical broadcast channel (PBCH), or the terminal equipment may transmit the uplink signal by using a spatial domain transmission filter the same as that of receiving a synchronization signal (SS). Principles of implementation thereof are identical to what is described above, and the description of which is omitted here.

In the scenario shown in FIG. 7b, successful cell handover occurs after the initial configuration of the first information, that is, the terminal equipment completes the initial configuration of the first information first, and then hands over to a new cell. In this scenario, from completion of the cell handover to activating or indicating by a network device which of the items therein is to be used, indication of uplink beams by the network device is also ambiguous, which is referred to as an ambiguous time period 7.

In the ambiguous time period 7, the terminal equipment may transmit the uplink signal by using the same spatial domain transmission filter as that of a received signal or a spatial domain transmission filter associated with a predetermined item in the first information. For example, the terminal equipment may transmit the uplink signal by using a spatial domain transmission filter associated with a pre-designated item in the first information, or the terminal equipment may transmit the uplink signal by using a spatial domain transmission filter associated with a configured default item in the first information, or the terminal equipment may transmit the uplink signal by using a spatial domain transmission filter the same as that of receiving a physical broadcast channel (PBCH), or the terminal equipment may transmit the uplink signal by using a spatial domain transmission filter the same as that of receiving a synchronization signal (SS). Principles of implementation thereof are identical to what is described above, and the description of which is omitted here.

In the scenarios shown in FIG. 7a and FIG. 7b, an uplink signal needing to be indicated by an uplink beam is generally an uplink control signal (PUCCH); however, this embodiment is not limited thereto. For example, the uplink signal needing to be indicated by an uplink beam may also be an SRS.

With the method of this embodiment, the terminal equipment may transmit an uplink signal by using a suitable spatial domain transmission filter in a case where an uplink beam is not determined according to the configuration of the network device, thereby solving the problem that a terminal equipment is unable to transmit an uplink signal in a case where an uplink beam is not determined.

Embodiment 2

Embodiment 2 of this disclosure provides an uplink signal reception method, which is applicable to a network device and is processing at a network side corresponding to the method of Embodiment 1, with contents identical to those in Embodiment 1 being not going to be described herein any further. FIG. 8 is a schematic diagram of the uplink signal reception method of this embodiment. As shown in FIG. 8, the method includes:

step 801: when a network device configures a terminal equipment with first information associated with a spatial relation for an uplink signal but the special relation for the uplink signal is not effective, the network device receives an uplink signal by using a spatial domain transmission filter the same as that of a received signal or a transmitted signal or using a spatial domain transmission filter associated with a default item in the first information.

In this embodiment, similar to Embodiment 1, a case where the first information includes multiple items shall be described only.

In this embodiment, the network device may configure the terminal equipment with the first information related to the spatial relation for the uplink signal. The first information includes multiple items, each item indicating a spatial relation. In this embodiment, as described above, the network device may configure the above first information via RRC signaling; however, this embodiment is not limited thereto. Moreover, a particular configuration mode is not limited in this embodiment.

Furthermore, the network device may indicate or activate an item in the first information that the terminal equipment needs to use for the terminal equipment. In this embodiment, as described above, the network device may indicate or activate the item that the terminal equipment needs to use via an MAC CE, and an indication or activation mode is not limited in this embodiment.

In this embodiment, corresponding to Embodiment 1, in a case where the network device configures the terminal equipment with the first information related to the spatial relation for the uplink signal but the spatial relation for the uplink signal is not effective, the network device may receive the uplink signal by using a spatial domain transmission filter the same as that of a received signal or a transmitted signal or a spatial domain transmission filter associated with a default item in the first information.

In one implementation, the configuration is the initial configuration for the first information. Corresponding to the ambiguous time period 1 in the scenario shown in FIG. 5, the network device may receive the uplink signal by using a spatial domain transmission filter the same as that of receiving a first message (msg.1) in a random access procedure, or the network device may receive the uplink signal by using a spatial domain transmission filter the same as that of receiving a third message (msg.3) in the random access procedure, or the network device may receive the uplink signal by using a spatial domain transmission filter associated with a pre-designated item in the first information, or the network device may receive the uplink signal by using a spatial domain transmission filter associated with a configured default item in the first information, or the network device may receive the uplink signal by using a spatial domain transmission filter the same as that of transmitting a broadcast signal (PBCH), or the network device may receive the uplink signal by using a spatial domain transmission filter the same as that of transmitting a synchronization signal (SS).

Corresponding to the ambiguous time period 2 of the scenario shown in FIG. 5, that is, in a case where the network device does not configure the terminal equipment with the first information related to the spatial relation for the uplink signal, the network device may receive the uplink signal by using the same spatial domain filter as a received signal or a transmitted signal. For example, the network device may receive the uplink signal by using a spatial domain transmission filter the same as that of receiving the first message (msg.1) in the random access procedure, or the network device may receive the uplink signal by using a spatial domain transmission filter the same as that of receiving the third message (msg.3) in the random access procedure, or the network device may receive the uplink signal by using a spatial domain filter the same as that of transmitting a broadcast signal (PBCH), or the network device may receive the uplink signal by using a spatial domain transmission filter the same as that of transmitting a synchronization signal (SS).

In one implementation, the configuration is the reconfiguration for the first information after a beam failure and successful recovery thereof.

Corresponding to the ambiguous time period 3 of the scenario shown in FIG. 6, after the beam failure and successful recovery thereof and before the reconfiguration, the network device may receive the uplink signal by using a spatial domain transmission filter the same as that of receiving a beam failure recovery request (BFRQ), or the network device may receive the uplink signal by using a spatial domain filter the same as that of successfully transmitting a beam failure recovery response control resource set (BFR-CORESET).

Corresponding to the ambiguous time period 4 of the scenario shown in FIG. 6, the network device may receive the uplink signal by using a spatial domain filter the same as that of receiving a beam failure recovery request (BFRQ), or the network device may receive the uplink signal by using a spatial domain filter the same as that of transmitting a beam failure recovery response control resource set (BFR-CORESET), or the network device may receive the uplink signal by using a spatial domain transmission filter associated with a pre-designated item in the first information, or the network device may receive the uplink signal by using a spatial domain transmission filter associated with a configured default item in the first information, or the network device may receive the uplink signal by using a spatial domain transmission filter the same as that of transmitting a broadcast signal (PBCH), or the network device may receive the uplink signal by using a spatial domain transmission filter the same as that of transmitting a synchronization signal (SS).

In one implementation, the configuration is initial configuration for the first information after successful cell handover.

Corresponding to the scenario where the successful cell handover occurs before the initial configuration shown in FIG. 7a, in the ambiguous time period 5, the network device may receive the uplink signal by using a spatial domain transmission filter the same as that of transmitting a broadcast signal (PBCH), or the network device may receive the uplink signal by using a spatial domain transmission filter the same as that of transmitting a synchronization signal (SS). In the ambiguous time period 6, the network device may receive the uplink signal by using a spatial domain transmission filter associated with a pre-designated item in the first information, or the network device may receive the uplink signal by using a spatial domain transmission filter associated with a configured default item in the first information, or the network device may receive the uplink signal by using a spatial domain transmission filter the same as that of transmitting a broadcast signal (PBCH), or the network device may receive the uplink signal by using a same spatial domain transmission filter the same as that of transmitting a synchronization signal (SS).

Corresponding to the scenario where the successful cell handover occurs after the initial configuration shown in FIG. 7b, in the ambiguous time period 7, the network device may receive the uplink signal by using a spatial domain transmission filter associated with a pre-designated item in the first information, or the network device may receive the uplink signal by using a spatial domain transmission filter associated with a configured default item in the first information, or the network device may receive the uplink signal by using a spatial domain transmission filter the same as that of transmitting a broadcast signal (PBCH), or the network device may receive the uplink signal by using a spatial domain transmission filter the same as that of transmitting a synchronization signal (SS).

In this embodiment, the network device may further configure a default item in the first information, and in a case where the network device configures the first information for the terminal equipment and does not indicate or activate an item needing to be used in the first information, the terminal equipment may transmit the uplink signal by using the spatial domain transmission filter associated with the default item. Hence, the network device may receive the uplink signal by using the spatial domain transmission filter associated with the default item.

With the method of this embodiment, the terminal equipment may transmit an uplink signal by using a suitable spatial domain transmission filter in a case where an uplink beam is not determined according to the configuration of the network device, thereby solving the problem that a terminal equipment is unable to transmit an uplink signal in a case where an uplink beam is not determined.

Embodiment 3

The embodiment of this disclosure provides an uplink signal transmission method, applicable to a terminal equipment. FIG. 9 is a schematic diagram of the uplink signal transmission method of this embodiment. As shown in FIG. 9, the method includes:

step 901: before a network device configures second information associated with a spatial relation for an uplink signal, a terminal equipment transmits an uplink signal by using a spatial domain transmission filter the same as that of a received signal or a transmitted signal, the second information including one item, the item indicating a spatial relation.

In this embodiment, the second information is, for example, above-described PUCCH-Spatial-relation-info. As described above, the second information may include multiple items, or may include one item, each item indicating or being associated with a spatial relation. For the convenience of description, this embodiment shall be described only for the case where the second information includes one item.

In one implementation of this embodiment, similar to the scenario shown in FIG. 5, when the above configuration is the initial configuration for the second information, since the second information includes only one item, completion of the configuration indicates an uplink beam. However, before this configuration, or in a case where the network device does not configure the terminal equipment with the above second information, namely, in the ambiguous time period 1, indication of the uplink beam by the network device is still ambiguous, and the terminal equipment may transmit the uplink signal by using a spatial domain transmission filter the same as that of a first message (msg.1) in a random access procedure, or the terminal equipment may transmit the uplink signal by using a spatial domain transmission filter the same as that of a third message (msg.3) in the random access procedure, or the terminal equipment may transmit the uplink signal by using a spatial domain transmission filter the same as that of receiving a broadcast signal (PBCH), or the terminal equipment may transmit the uplink signal by using a spatial domain transmission filter the same as that of receiving a synchronization signal (SS). Principles of implementation thereof are described in Embodiment 1, and shall not be described herein any further.

In another implementation of this embodiment, similar to the scenario shown in FIG. 6, when the above configuration is reconfiguration for the second information after beam failure and successful recovery thereof, in the ambiguous time period 3, that is, after the beam failure and successful recovery thereof and before the reconfiguration, the terminal equipment may transmit the uplink signal by using a spatial domain transmission filter the same as that of transmitting a beam failure recovery request (BFRQ), or the terminal equipment may transmit the uplink signal by using a spatial domain transmission filter the same as that of receiving a beam failure recovery response control resource set (BFR-CORESET). Principles of implementation thereof are described in Embodiment 1, and shall not be described herein any further.

In a further implementation of this embodiment, similar to the scenario shown in FIG. 7a, when the above configuration is the initial configuration for the second information that occurs after success of cell handover and the success of cell handover occurs before the initial configuration, in the ambiguous time period 5, that is, after the success of cell handover and before the initial configuration, the terminal equipment may transmit the uplink signal by using a spatial domain transmission filter the same as that of receiving a broadcast signal (PBCH), or the terminal equipment may transmit the uplink signal by using a spatial domain transmission filter the same as that of receiving a synchronization signal (SS). Principles of implementation thereof are described in Embodiment 1, and shall not be described herein any further.

With the method of this embodiment, the terminal equipment may transmit an uplink signal by using a suitable spatial domain transmission filter in a case where the configuration for the second information by the network device is not obtained, thereby solving the problem that a terminal equipment is unable to transmit an uplink signal in a case where an uplink beam is not determined.

Embodiment 4

The embodiment of this disclosure provides an uplink signal reception method, which is applicable to a network device and is processing at a network side corresponding to the method of Embodiment 3, with contents identical to those in Embodiment 3 being not going to be described herein any further. FIG. 10 is a schematic diagram of the uplink signal reception method of this embodiment. As shown in FIG. 10, the method includes:

step 1001: before a network device configures a terminal equipment with second information associated with a spatial relation for an uplink signal, the network device receives an uplink signal by using a spatial domain transmission filter the same as that of a transmitted signal or a received signal, the second information including one item, the item indicating a spatial relation.

In one implementation of this embodiment, the above configuration is initial configuration for the second information, corresponding to the scenario shown in FIG. 5, in the ambiguous time period 1, the network device may receive the uplink signal by using a spatial domain transmission filter the same as that of receiving a first message (msg.1) in a random access procedure, or the network device may receive the uplink signal by using a spatial domain transmission filter the same as that of receiving a third message (msg.3) in a random access procedure, or the network device may receive the uplink signal by using a spatial domain transmission filter the same as that of transmitting a physical broadcast channel (PBCH), or the network device may receive the uplink signal by using a spatial domain transmission filter the same as that of transmitting a synchronization signal (SS).

In another implementation of this embodiment, the configuration is reconfiguration for the second information after a beam failure and successful recovery, corresponding to the scenario shown in FIG. 6, in the ambiguous time period 3, i.e. after the beam failure and successful recovery and before the reconfiguration, the network device may receive the uplink signal by using a spatial domain transmission filter the same as that of receiving a beam failure recovery request (BFRQ), or the network device may receive the uplink signal by using a spatial domain transmission filter the same as that of transmitting a beam failure recovery response control resource set (BFR-CORESET).

In a further implementation of this embodiment, the configuration is initial configuration for the second information occurred after success of a cell handover, and the success of the cell handover occurs before the initial configuration, corresponding to the scenario shown in FIG. 7a, in the ambiguous time period 5, i.e. after the success of the cell handover and before the initial configuration, the network device may receive the uplink signal by using a spatial domain transmission filter the same as that of transmitting a physical broadcast channel (PBCH), or the network device may receive the uplink signal by using a spatial domain transmission filter the same as that of transmitting a synchronization signal (SS).

In this embodiment, as described above, the network device may further configure the terminal equipment with the second information associated with the spatial relation for the uplink signal, the second information including one item, the item indicating a spatial relation. A particular mode of configuration is not limited in this embodiment; for example, the network device may configure the second information via RRC signaling; however, this embodiment is not limited thereto.

With the method of this embodiment, the terminal equipment may transmit an uplink signal by using a suitable spatial domain transmission filter in a case where the configuration for the second information by the network device is not obtained, thereby solving the problem that a terminal equipment is unable to transmit an uplink signal in a case where an uplink beam is not determined.

Embodiment 5

The embodiment of this disclosure provides an uplink signal transmission apparatus, configured in a terminal equipment. As principles of the apparatus for solving problems are similar to that of the method in Embodiment 1, reference may be made to the implementation of the method in Embodiment 1 for implementation of this apparatus, with identical contents being going to be described herein any further.

Figure 11:
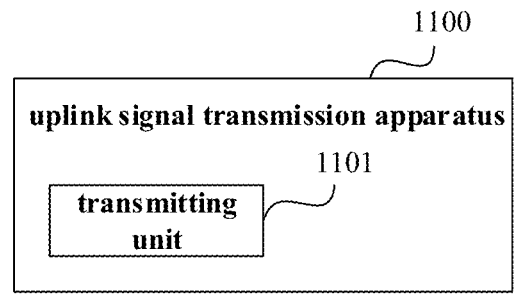
FIG. 11 is a schematic diagram of the uplink signal transmission apparatus of Embodiment 5.

FIG. 11 is a schematic diagram of the uplink signal transmission apparatus of this embodiment. Referring to FIG. 11, an uplink signal transmission apparatus 1100 includes:

a transmitting unit 1101 configured to, when a network device configures first information associated with a spatial relation for an uplink signal but the special relation for the uplink signal is not effective, transmit an uplink signal by using a spatial domain transmission filter the same as that of a transmitted signal or a received signal or using a spatial domain transmission filter associated with a predetermined item in the first information.

In this embodiment, the first information includes one or more items, each item indicating a spatial relation, and the special relation for the uplink signal being not effective refers to that the network device does not activate or indicate an item in the first information needing to be used by the terminal equipment.

In one implementation, the configuration is the initial configuration for the first information (the scenario shown in FIG. 5), and in the ambiguous time period 2, the transmitting unit 1101 transmits the uplink signal by using a spatial domain transmission filter the same as that of a first message (msg.1) in a random access procedure, or the transmitting unit 1101 transmits the uplink signal by using a spatial domain transmission filter the same as that of a third message (msg.3) in a random access procedure, or the transmitting unit 1101 transmits the uplink signal by using a spatial domain transmission filter associated with a pre-designated item in the first information, or the transmitting unit 1101 transmits the uplink signal by using a spatial domain transmission filter associated with a configured default item in the first information, or the transmitting 1101 unit transmits the uplink signal by using a spatial domain transmission filter the same as that of receiving a physical broadcast channel (PBCH), or the transmitting unit 1101 transmits the uplink signal by using a spatial domain transmission filter the same as that of receiving a synchronization signal (SS).

In another implementation, the configuration is reconfiguration for the first information after a beam failure and successful recovery (the scenario shown in FIG. 6), and in the ambiguous time period 4, the transmitting unit 1101 transmits the uplink signal by using a spatial domain transmission filter the same as that of transmitting a beam failure recovery request (BFRQ), or the transmitting unit 1101 transmits the uplink signal by using a spatial domain transmission filter the same as that of receiving successfully a beam failure recovery response control resource set (BFR-CORESET), or the transmitting unit 1101 transmits the uplink signal by using a spatial domain transmission filter associated with a pre-designated item in the first information, or the transmitting unit 1101 transmits the uplink signal by using a spatial domain transmission filter associated with a configured default item in the first information, or the transmitting unit 1101 transmits the uplink signal by using a spatial domain transmission filter the same as that of receiving a PBCH, or the transmitting unit 1101 transmits the uplink signal by using a spatial domain transmission filter the same as that of receiving an SS.

In this implementation, after the beam failure and successful recovery and before the reconfiguration (in the ambiguous time period 3), the transmitting unit 1101 transmits the uplink signal by using a spatial domain transmission filter the same as that of transmitting a beam failure recovery request (BFRQ), or the transmitting unit 1101 transmits the uplink signal by using a spatial domain transmission filter the same as that of receiving successfully a beam failure recovery response control resource set (BFR-CORESET).

In a further implementation, the configuration is the initial configuration for the first information occurred after successful cell handover (the scenarios shown in FIGS. 7a and 7b), and in the ambiguous time period 6 or the ambiguous time period 7, the transmitting unit 1101 transmits the uplink signal by using a spatial domain transmission filter associated with a pre-designated item in the first information, or the transmitting unit 1101 transmits the uplink signal by using a spatial domain transmission filter associated with a configured default item in the first information, or the transmitting unit 1101 transmits the uplink signal by using a spatial domain transmission filter the same as that of receiving a PBCH, or the transmitting unit 1101 transmits the uplink signal by using a spatial domain transmission filter the same as that of receiving an SS. And in the ambiguous time period 5, i.e., the success of cell handover occurs before the initial configuration, after the success of cell handover and before the initial configuration, the transmitting unit 1101 transmits the uplink signal by using a spatial domain transmission filter the same as that of receiving a PBCH, or the transmitting unit 1101 transmits the uplink signal by using a spatial domain transmission filter the same as that of receiving an SS.

In still another implementation, the configuration is the initial configuration for the first information, and before the configuration, the transmitting unit 1101 transmits the uplink signal by using a spatial domain transmission filter the same as that of a first message (msg.1) in a random access procedure, or the transmitting unit 1101 transmits the uplink signal by using a spatial domain transmission filter the same as that of a third message (msg.3) in a random access procedure, or the transmitting unit 1101 transmits the uplink signal by using a spatial domain transmission filter the same as that of receiving a physical broadcast channel (PBCH), or the transmitting unit 1101 transmits the uplink signal by using a spatial domain transmission filter the same as that of receiving a synchronization signal (SS).

With the apparatus of this embodiment, the terminal equipment may transmit an uplink signal by using a suitable spatial domain transmission filter in a case where an uplink beam is not determined according to the configuration of the network device, thereby solving the problem that a terminal equipment is unable to transmit an uplink signal in a case where an uplink beam is not determined.

Embodiment 6

The embodiment of this disclosure provides an uplink signal reception apparatus, configured in a network device. As principles of the apparatus for solving problems are similar to that of the method in Embodiment 2, reference may be made to the implementation of the method in Embodiment 2 for implementation of this apparatus, with identical contents being not going to be described herein any further.

Figure 12:
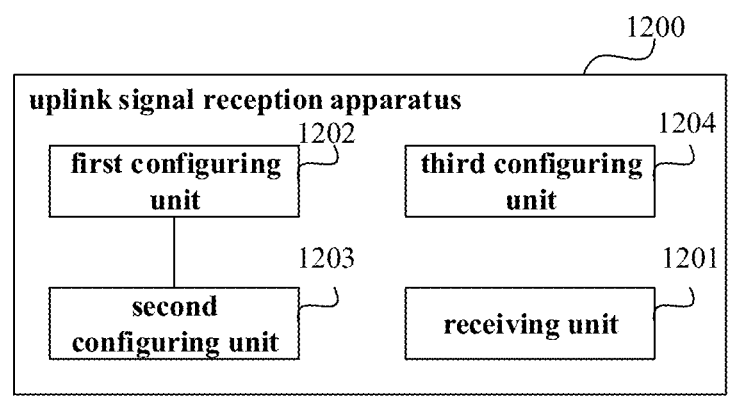
FIG. 12 is a schematic diagram of the uplink signal reception apparatus of Embodiment 6.

FIG. 12 is a schematic diagram of the uplink signal reception apparatus of this embodiment. Referring to FIG. 12, the uplink signal reception apparatus 1200 includes:

a receiving unit 1201 configured to, when the network device configures a terminal equipment with first information associated with a spatial relation for an uplink signal but the special relation for the uplink signal is not effective, receive an uplink signal by using a spatial domain transmission filter the same as that of a received signal or a transmitted signal or using a spatial domain transmission filter associated with a default item in the first information.

In one implementation, the configuration is initial configuration for the first information, and the receiving unit 1201 receives the uplink signal by using a spatial domain transmission filter the same as that of receiving a first message (msg.1) in a random access procedure, or the receiving unit 1201 receives the uplink signal by using a spatial domain transmission filter the same as that of receiving a third message (msg.3) in a random access procedure, or the receiving unit 1201 receives the uplink signal by using a spatial domain transmission filter associated with a pre-designated item in the first information, or the receiving unit 1201 receives the uplink signal by using a spatial domain transmission filter associated with a configured default item in the first information, or the receiving unit 1201 receives the uplink signal by using a spatial domain transmission filter the same as that of transmitting a physical broadcast channel (PBCH), or the receiving unit 1201 receives the uplink signal by using a spatial domain transmission filter the same as that of transmitting a synchronization signal (SS).

In another implementation, the configuration is reconfiguration for the first information after a beam failure and successful recovery, and the receiving unit 1201 receives the uplink signal by using a spatial domain transmission filter the same as that of receiving a beam failure recovery request (BFRQ), or the receiving unit 1201 receives the uplink signal by using a spatial domain transmission filter the same as that of transmitting a beam failure recovery response control resource set (BFR-CORESET), or the receiving unit 1201 receives the uplink signal by using a spatial domain transmission filter associated with a pre-designated item in the first information, or the receiving unit 1201 receives the uplink signal by using a spatial domain transmission filter associated with a configured default item in the first information, or the receiving unit 1201 receives the uplink signal by using a spatial domain transmission filter the same as that of transmitting a physical broadcast channel (PBCH), or the receiving unit 1201 receives the uplink signal by using a spatial domain transmission filter the same as that of transmitting a synchronization signal (SS).

In this implementation, after the beam failure and successful recovery and before the reconfiguration, the receiving unit 1201 receives the uplink signal by using a spatial domain transmission filter the same as that of receiving a beam failure recovery request (BFRQ), or the receiving unit 1201 receives the uplink signal by using a spatial domain transmission filter the same as that of transmitting successfully a beam failure recovery response control resource set (BFR-CORESET).

In a further implementation, the configuration is initial configuration for the first information occurred after success of a cell handover, the receiving unit 1201 receives the uplink signal by using a spatial domain transmission filter associated with a pre-designated item in the first information, or the receiving unit 1201 receives the uplink signal by using a spatial domain transmission filter associated with a configured default item in the first information, or the receiving unit 1201 receives the uplink signal by using a spatial domain transmission filter the same as that of transmitting a physical broadcast channel (PBCH), or the receiving unit 1201 receives the uplink signal by using a spatial domain transmission filter the same as that of transmitting a synchronization signal (SS).

In this implementation, if the success of the cell handover occurs before the initial configuration, after the success of the cell handover and before the reconfiguration, the receiving unit 1201 receives the uplink signal by using a spatial domain transmission filter the same as that of transmitting a physical broadcast channel (PBCH), or the receiving unit 1201 receives the uplink signal by using a spatial domain transmission filter the same as that of transmitting a synchronization signal (SS).

In this implementation, if the success of the cell handover occurs after the initial configuration, after the cell handover, the receiving unit 1201 receives the uplink signal by using a spatial domain transmission filter associated with a pre-designated item in the first information, or the receiving unit 1201 receives the uplink signal by using a spatial domain transmission filter associated with a configured default item in the first information, or the receiving unit 1201 receives the uplink signal by using a spatial domain transmission filter the same as that of transmitting a physical broadcast channel (PBCH), or the receiving unit 1201 receives the uplink signal by using a spatial domain transmission filter the same as that of transmitting a synchronization signal (SS).

In still another implementation, when the network device does not configure the terminal equipment with the first information associated with the spatial relation for the uplink signal, the receiving unit 1201 receives the uplink signal by using a spatial domain transmission filter the same as that of a received signal or a transmitted signal, or the receiving unit 1201 receives the uplink signal by using a spatial domain transmission filter the same as that of a first message (msg.1) in a random access procedure, or the receiving unit 1201 receives the uplink signal by using a spatial domain transmission filter the same as that of a third message (msg.3) in a random access procedure, or the receiving unit 1201 receives the uplink signal by using a spatial domain transmission filter the same as that of transmitting a physical broadcast channel (PBCH), or the receiving unit 1201 receives the uplink signal by using a spatial domain transmission filter the same as that of transmitting a synchronization signal (SS).

In this embodiment, as shown in FIG. 12, the apparatus 1200 may further include:

a first configuring unit 1202 configured to configure the terminal equipment with the first information associated with the spatial relation for the uplink signal, the first information including multiple items, each item indicating a spatial relation; and a second configuring unit 1203 configured to indicate or activate an item in the first information needing to be used by the terminal equipment for the terminal equipment.

In one implementation, as shown in FIG. 12, the apparatus 1200 may further include:

a third configuring unit 1204 configured to configure a default item in the first information; and the terminal equipment transmits the uplink signal by using a spatial domain transmission filter associated with the default item when the first configuring unit 1202 configures the terminal equipment with the first information and an item needing to be used is not indicated or activated by the second configuring unit 1203.

With the apparatus of this embodiment, the terminal equipment may transmit an uplink signal by using a suitable spatial domain transmission filter in a case where an uplink beam is not determined according to the configuration of the network device, thereby solving the problem that a terminal equipment is unable to transmit an uplink signal in a case where an uplink beam is not determined.

Embodiment 7

The embodiment of this disclosure provides an uplink signal transmission apparatus, configured in a terminal equipment. As principles of the apparatus for solving problems are similar to that of the method in Embodiment 3, reference may be made to the implementation of the method in Embodiment 3 for implementation of this apparatus, with identical contents being not going to be described herein any further.

Figure 13:
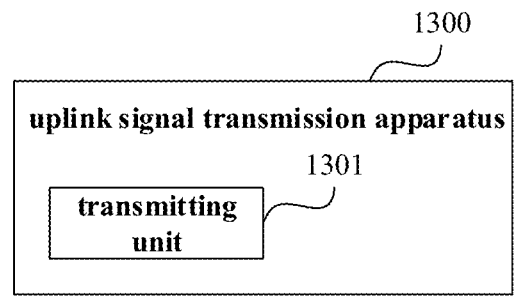
FIG. 13 is a schematic diagram of the uplink signal transmission apparatus of Embodiment 7.

FIG. 13 is a schematic diagram of the uplink signal transmission apparatus of this embodiment. Referring to FIG. 13, an uplink signal transmission apparatus 1300 includes:

a transmitting unit 1301 configured to, before a network device configures second information associated with a spatial relation for an uplink signal, transmit an uplink signal by using a spatial domain transmission filter the same as that of a transmitted signal or a received signal, the second information including one item, the item indicating a spatial relation.

In one implementation, the configuration is initial configuration for the second information, and the transmitting unit 1301 transmits the uplink signal by using a spatial domain transmission filter the same as that of a first message (msg.1) in a random access procedure, or the transmitting unit 1301 transmits the uplink signal by using a spatial domain transmission filter the same as that of a third message (msg.3) in a random access procedure, or the transmitting unit 1301 transmits the uplink signal by using a spatial domain transmission filter the same as that of receiving a physical broadcast channel (PBCH), or the transmitting unit 1301 transmits the uplink signal by using a spatial domain transmission filter the same as that of receiving a synchronization signal (SS).

In another implementation, the configuration is reconfiguration for the second information after a beam failure and successful recovery, after the beam failure and successful recovery and before the reconfiguration, the transmitting unit 1301 transmits the uplink signal by using a spatial domain transmission filter the same as that of transmitting a beam failure recovery request (BFRQ), or the transmitting unit 1301 transmits the uplink signal by using a spatial domain transmission filter the same as that of receiving successfully a beam failure recovery response control resource set (BFR-CORESET).

In a further implementation, the configuration is initial configuration for the second information occurred after success of a cell handover, and the success of the cell handover occurs before the initial configuration, after the success of the cell handover and before the initial configuration, the transmitting unit 1301 transmits the uplink signal by using a spatial domain transmission filter the same as that of receiving a physical broadcast channel (PBCH), or the transmitting unit 1301 transmits the uplink signal by using a spatial domain transmission filter the same as that of receiving a synchronization signal (SS).

With the apparatus of this embodiment, the terminal equipment may transmit an uplink signal by using a suitable spatial domain transmission filter in a case where the configuration for the second information by the network device is not obtained, thereby solving the problem that a terminal equipment is unable to transmit an uplink signal in a case where an uplink beam is not determined.

Embodiment 8

The embodiment of this disclosure provides an uplink signal reception apparatus, configured in a network device. As principles of the apparatus for solving problems are similar to that of the method in Embodiment 4, reference may be made to the implementation of the method in Embodiment 4 for implementation of this apparatus, with identical contents being not going to be described herein any further.

Figure 14:
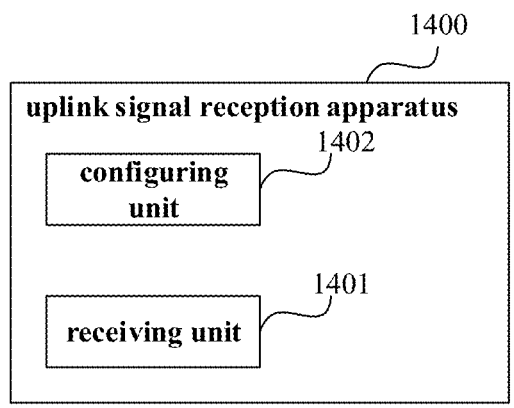
FIG. 14 is a schematic diagram of the uplink signal reception apparatus of Embodiment 8.

FIG. 14 is a schematic diagram of the uplink signal reception apparatus of this embodiment. Referring to FIG. 14, an uplink signal reception apparatus 1400 includes:

a receiving unit 1401 configured to, before the network device configures a terminal equipment with second information associated with a spatial relation for an uplink signal, receive an uplink signal by using a spatial domain transmission filter the same as that of a transmitted signal or a received signal, the second information including one item, the item indicating a spatial relation.

In one implementation, the configuration is initial configuration for the second information, and the receiving unit 1401 receives the uplink signal by using a spatial domain transmission filter the same as that of receiving a first message (msg.1) in a random access procedure, or the receiving unit 1401 receives the uplink signal by using a spatial domain transmission filter the same as that of receiving a third message (msg.3) in a random access procedure, or the receiving unit 1401 receives the uplink signal by using a spatial domain transmission filter the same as that of transmitting a physical broadcast channel (PBCH), or the receiving unit 1401 receives the uplink signal by using a spatial domain transmission filter the same as that of transmitting a synchronization signal (SS).

In another implementation, the configuration is reconfiguration for the second information after a beam failure and successful recovery, and after the beam failure and successful recovery and before the reconfiguration, the receiving unit 1401 receives the uplink signal by using a spatial domain transmission filter the same as that of receiving a beam failure recovery request (BFRQ), or the receiving unit 1401 receives the uplink signal by using a spatial domain transmission filter the same as that of transmitting a beam failure recovery response control resource set (BFR-CORE-SET).

In a further implementation, the configuration is initial configuration for the second information occurred after success of cell handover, and the success of the cell handover occurs before the initial configuration, after the success of the cell handover and before the initial configuration, the receiving unit 1401 receives the uplink signal by using a spatial domain transmission filter the same as that of transmitting a physical broadcast channel (PBCH), or the receiving unit 1401 receives the uplink signal by using a spatial domain transmission filter the same as that of transmitting a synchronization signal (SS).

In this embodiment, as shown in FIG. 14, the apparatus 1400 may further include:

a configuring unit 1402 configured to configure the terminal equipment with the second information associated with the spatial relation for the uplink signal, the second information including one item, the item indicating a spatial relation.

With the apparatus of this embodiment, the terminal equipment may transmit an uplink signal by using a suitable spatial domain transmission filter in a case where the configuration for the second information by the network device is not obtained, thereby solving the problem that a terminal equipment is unable to transmit an uplink signal in a case where an uplink beam is not determined.

Embodiment 9

The embodiment of this disclosure provides a terminal equipment, including the apparatus as described in Embodiment 5 or 7.

Figure 15:
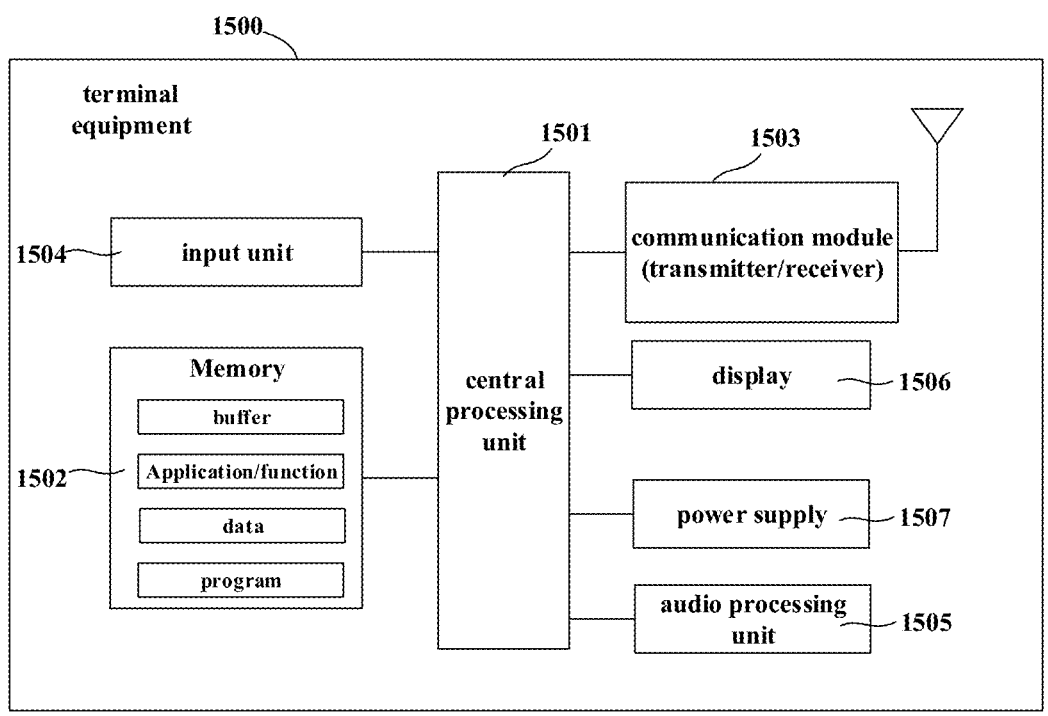
FIG. 15 is a schematic diagram of the terminal equipment of Embodiment 9.

FIG. 15 is a block diagram of the terminal equipment of the embodiment of this disclosure. As shown in FIG. 15, a terminal equipment 1500 may include a central processing unit 1501 and a memory 1502, the memory 1502 being coupled to the central processing unit 1501. It should be noted that his figure is illustrative only, and other types of structures may also be used, so as to supplement or replace this structure and achieve a telecommunications function or other functions.

In one implementation, the functions of the apparatus described in Embodiment 5 or 7 may be integrated into the central processing unit 1501, and the functions of the apparatus described in Embodiment 5 or 7 are carried out by the central processing unit 1501; wherein the functions of the apparatus described in Embodiment 5 or 7 are incorporated herein, and shall not be described herein any further.

In another implementation, the apparatus described in Embodiment 5 or 7 and the central processing unit 1501 may be configured separately; for example, the apparatus described in Embodiment 5 or 7 may be configured as a chip connected to the central processing unit 1501, and the functions of the apparatus described in Embodiment 5 or 7 are executed under control of the central processing unit 1501.

As shown in FIG. 15, the terminal equipment 1500 may further include a communication module 1503, an input unit 1504, an audio processing unit 1505, a display 1506, and a power supply 1507. It should be noted that the terminal equipment 1500 does not necessarily include all the parts shown in FIG. 15, and the above components are not necessary. Furthermore, the terminal equipment 1500 may include parts not shown in FIG. 15, and the related art may be referred to.

As shown in FIG. 15, the central processing unit 1501 is sometimes referred to as a controller or control, which may include a microprocessor or other processor devices and/or logic devices, and the central processing unit 1501 receives input and controls operations of every component of the terminal equipment 1500.

The memory 1502 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 1501 may execute programs stored in the memory 1502, so as to realize information storage or processing, etc. Functions of other parts are similar to those of the related art, which shall not be described herein any further. The parts of the terminal equipment 1500 may be realized by specific hardware, firmware, software, or any combination thereof, without departing from the scope of this disclosure.

With the terminal equipment of this embodiment, when the apparatus in Embodiment 5 is contained, the terminal equipment may transmit an uplink signal by using a suitable spatial domain transmission filter in a case where an uplink beam is not determined according to the configuration of the network device, and when the apparatus in Embodiment 7 is contained, the terminal equipment may transmit an uplink signal by using a suitable spatial domain transmission filter in a case where the configuration for the second information by the network device is not obtained, thereby solving the problem that a terminal equipment is unable to transmit an uplink signal in a case where an uplink beam is not determined.

Embodiment 10

The embodiment of this disclosure provides a network device, including the apparatus as described in Embodiment 6 or 8.

Figure 16:
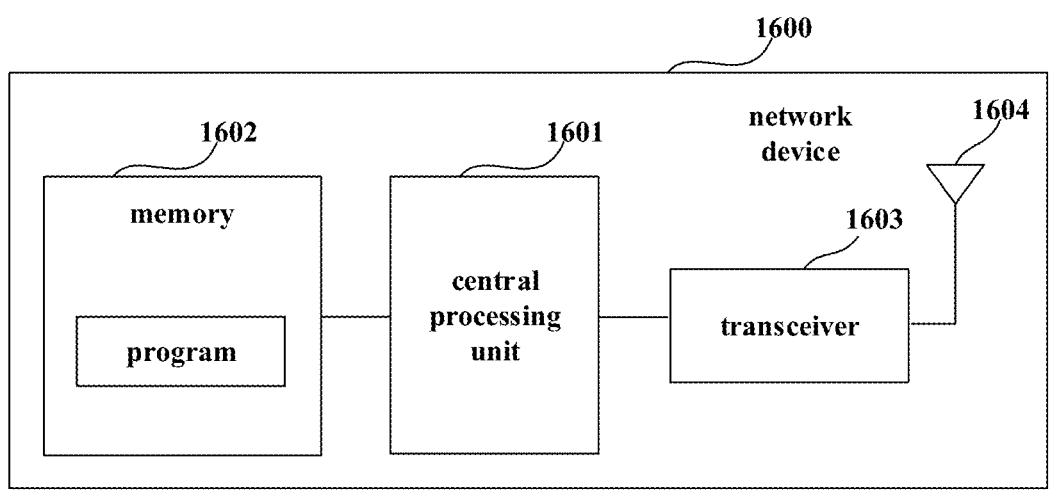
FIG. 16 is a schematic diagram of the network device of Embodiment 10.

FIG. 16 is a schematic diagram of a structure of one implementation of the network device of the embodiment of this disclosure. As shown in FIG. 16, a network device 1600 may include a central processing unit (CPU) 1601 and a memory 1602, the memory 1602 being coupled to the central processing unit 1601. The memory 1602 may store various data, and furthermore, it may store a program for data processing, and execute the program under control of the central processing unit 1601, so as to receive various information transmitted by a terminal equipment and transmit various information to the terminal equipment.

In one implementation, the functions of the apparatus described in Embodiment 6 or 8 may be integrated into the central processing unit 1601, and the functions of the apparatus described in Embodiment 6 or 8 are carried out by the central processing unit 1601; wherein the functions of the apparatus described in Embodiment 6 or 8 are incorporated herein, and shall not be described herein any further.

In another implementation, the apparatus described in Embodiment 6 or 8 and the central processing unit 1601 may be configured separately; for example, the apparatus described in Embodiment 6 or 8 may be configured as a chip connected to the central processing unit 1601, and the functions of the apparatus described in Embodiment 6 or 8 are executed under control of the central processing unit 1601.

Furthermore, as shown in FIG. 16, the network device 1600 may include a transceiver 1603, and an antenna 1604, etc. Functions of the above components are similar to those in the related art, and shall not be described herein any further. It should be noted that the network device 1600 does not necessarily include all the parts shown in FIG. 16, and furthermore, the network device 1600 may include parts not shown in FIG. 16, and the related art may be referred to.

With the network device of this embodiment, when the apparatus in Embodiment 6 is contained, the terminal equipment may transmit an uplink signal by using a suitable spatial domain transmission filter in a case where an uplink beam is not determined according to the configuration of the network device, and when the apparatus in Embodiment 8 is contained, the terminal equipment may transmit an uplink signal by using a suitable spatial domain transmission filter in a case where the configuration for the second information by the network device is not obtained, thereby solving the problem that a terminal equipment is unable to transmit an uplink signal in a case where an uplink beam is not determined.

Embodiment 11

The embodiment of this disclosure provides a communication system, including a network device and a terminal equipment, the network device being, for example, the network device 1600 described in Embodiment 10, and the terminal equipment being, for example, the terminal equipment 1500 described in Embodiment 9.

In this embodiment, the terminal equipment is, for example, a UE served by a gNB, and includes conventional compositions and functions of a terminal equipment, in addition to the functions of the apparatus described in Embodiment 5 or 7, which are as described in Embodiment 9, and shall not be described herein any further.

In this embodiment, the network device may be, for example, a gNB in NR, and includes conventional compositions and functions of a network device, in addition to the functions of the apparatus described in Embodiment 6 or 8, which are as described in Embodiment 10, and shall not be described herein any further.

With the communication system of this embodiment, the problem that a terminal equipment is unable to transmit an uplink signal in a case where an uplink beam is not determined can be solved.

An embodiment of this disclosure provides a computer readable program, which, when executed in a terminal equipment, will cause a computer to carry out the method described in Embodiment 1 or 3 in the terminal equipment.

An embodiment of this disclosure provides a computer storage medium, including a computer readable program, which will cause a computer to carry out the method described in Embodiment 1 or 3 in a terminal equipment.

An embodiment of this disclosure provides a computer readable program, which, when executed in a network device, will cause a computer to carry out the method described in Embodiment 2 or 4 in the network device.

An embodiment of this disclosure provides a computer storage medium, including a computer readable program, which will cause a computer to carry out the method described in Embodiment 2 or 4 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 8-10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For implementations of this disclosure containing the above embodiments, following supplements are further disclosed.

Supplement 1. An uplink signal transmission apparatus, configured in a terminal equipment, the apparatus including:

a transmitting unit configured to, before a network device configures second information associated with a spatial relation for an uplink signal, transmit an uplink signal by using a same spatial domain transmission filter the same as that of a transmitted signal or a received signal, the second information including one item, the item indicating a spatial relation.

Supplement 2. The apparatus according to supplement 1, wherein the configuration is initial configuration for the second information, and the transmitting unit transmits the uplink signal by using a spatial domain transmission filter the same as that of transmitting a first message (msg.1) in a random access procedure, or the transmitting unit transmits the uplink signal by using a spatial domain transmission filter the same as that of transmitting a third message (msg.3) in a random access procedure, or the transmitting unit transmits the uplink signal by using a spatial domain transmission filter the same as that of receiving a physical broadcast channel (PBCH), or the transmitting unit transmits the uplink signal by using a spatial domain transmission filter the same as that of receiving a synchronization signal (SS).

Supplement 3. The apparatus according to supplement 1, wherein the configuration is reconfiguration for the second information after a beam failure and successful recovery, after the beam failure and successful recovery and before the reconfiguration, the transmitting unit transmits the uplink signal by using a spatial domain transmission filter the same as that of transmitting a beam failure recovery request (BFRQ), or the transmitting unit transmits the uplink signal by using a spatial domain transmission filter the same as that of receiving successfully a beam failure recovery response control resource set (BFR-CORESET).

Supplement 4. The apparatus according to supplement 1, wherein the configuration is initial configuration for the second information occurred after success of a cell handover, and the success of the cell handover occurs before the initial configuration, after the success of the cell handover and before the initial configuration, the transmitting unit transmits the uplink signal by using a spatial domain transmission filter the same as that of receiving a physical broadcast channel (PBCH), or the transmitting unit transmits the uplink signal by using a spatial domain transmission filter the same as that of receiving a synchronization signal (SS).

Supplement 5. An uplink signal reception apparatus, configured in a network device, the apparatus including:

a receiving unit configured to, before the network device configures a terminal equipment with second information associated with a spatial relation for an uplink signal, receive an uplink signal by using a spatial domain transmission filter the same as that of a transmitted signal or a received signal, the second information including one item, the item indicating a spatial relation.

Supplement 6. The apparatus according to supplement 5, wherein the configuration is initial configuration for the second information, and the receiving unit receives the uplink signal by using a spatial domain transmission filter the same as that of receiving a first message (msg.1) in a random access procedure, or the receiving unit receives the uplink signal by using a spatial domain transmission filter the same as that of receiving a third message (msg.3) in a random access procedure, or the receiving unit receives the uplink signal by using a spatial domain transmission filter the same as that of transmitting a physical broadcast channel (PBCH), or the receiving unit receives the uplink signal by using a spatial domain transmission filter the same as that of transmitting a synchronization signal (SS).

Supplement 7. The apparatus according to supplement 5, wherein the configuration is reconfiguration for the second information after a beam failure and successful recovery, and after the beam failure and successful recovery and before the reconfiguration, the receiving unit receives the uplink signal by using a spatial domain transmission filter the same as that of receiving a beam failure recovery request (BFRQ), or the receiving unit receives the uplink signal by using a spatial domain transmission filter the same as that of transmitting a beam failure recovery response control resource set (BFR-CORESET).

Supplement 8. The apparatus according to supplement 5, wherein the configuration is initial configuration for the second information occurred after success of a cell handover, and the success of the cell handover occurs before the initial configuration, after the success of the cell handover and before the initial configuration, the receiving unit receives the uplink signal by using a spatial domain transmission filter the same as that of transmitting a physical broadcast channel (PBCH), or the receiving unit receives the uplink signal by using a spatial domain transmission filter the same as that of transmitting a synchronization signal (SS).

Supplement 9. The apparatus according to supplement 5, wherein the apparatus further includes:

a configuring unit configured to configure the terminal equipment with the second information associated with the spatial relation for the uplink signal, the second information including one item, the item indicating a spatial relation.

What is claimed is:

1. An uplink signal transmission apparatus, configured in a terminal equipment, the apparatus comprising:
   a transmitter configured to, transmit an uplink signal by using a spatial domain transmission filter the same as that of a transmitted signal or a received signal before receiving a configuration information associated with a spatial relation for uplink control channel; and
   a receiver configured to receive the configuration information,
   wherein the configuration information is a list for spatial relation indication and the configuration information includes a single entry.

2. The apparatus according to claim 1, wherein the transmitter transmits
   the uplink signal by using a spatial domain transmission filter the same as that of transmitting a first message (msg.1) in a random access procedure.

3. The apparatus according to claim 1, wherein the transmitter transmits
   the uplink signal by using a spatial domain transmission filter the same as that of transmitting a third message (msg.3) in a random access procedure, or
   the uplink signal by using a spatial domain transmission filter the same as that of receiving a physical broadcast channel (PBCH), or
   the uplink signal by using a spatial domain transmission filter the same as that of receiving a synchronization signal (SS).

4. The apparatus according to claim 1, wherein the transmitter transmits, after a beam failure and successful recovery, the uplink signal by using a spatial domain transmission filter the same as that of transmitting a beam failure recovery request (BFRQ).

5. The apparatus according to claim 1, wherein the transmitter transmits, after a beam failure and successful recovery, the uplink signal by using a spatial domain transmission filter the same as that of receiving successfully a beam failure recovery response control resource set (BFR-CORESET).

6. The apparatus according to claim 1, wherein the configuration information is initial configuration for the information occurred after success of a cell handover, and the success of the cell handover occurs before the initial configuration, after the success of the cell handover and before the initial configuration, the transmitter transmits the uplink signal by using a spatial domain transmission filter the same as that of receiving a physical broadcast channel (PBCH), or the transmitter transmits the uplink signal by using a spatial domain transmission filter the same as that of receiving a synchronization signal (SS).

7. The apparatus according to claim 1, wherein the configuration information is reconfiguration for the information after a beam failure and successful recovery.

8. An uplink signal reception apparatus, configured in a network device, the apparatus comprising:
a receiver configured to, receive an uplink signal by using a spatial domain transmission filter the same as that of a received signal or a transmitted signal before transmitting a configuration information associated with a spatial relation for uplink control channel; and
a transmitter configured to transmit the configuration information,
wherein the configuration information is a list for spatial relation indication and the configuration information includes a single entry.

9. The apparatus according to claim 8, wherein the receiver receives
the uplink signal by using a spatial domain transmission filter the same as that of receiving a first message (msg.1) in a random access procedure.

10. The apparatus according to claim 8, wherein the receiver receives
the uplink signal by using a spatial domain transmission filter the same as that of receiving a third message (msg.3) in a random access procedure, or
the uplink signal by using a spatial domain transmission filter the same as that of transmitting a physical broadcast channel (PBCH), or
the uplink signal by using a spatial domain transmission filter the same as that of transmitting a synchronization signal (SS).

11. The apparatus according to claim 8, wherein the receiver receives, after a beam failure and successful recovery, the uplink signal by using a spatial domain transmission filter the same as that of receiving a beam failure recovery request (BFRQ).

12. The apparatus according to claim 8, wherein the receiver receives, after a beam failure and successful recovery, the uplink signal by using a spatial domain transmission filter the same as that of transmitting a beam failure recovery response control resource set (BFR-CORESET).

13. The apparatus according to claim 8, wherein, the configuration information is initial configuration for the information occurred after success of a cell handover, and the success of the cell handover occurs before the initial configuration, after the success of the cell handover and before the initial configuration, the receiver receives the uplink signal by using a spatial domain transmission filter the same as that of transmitting a physical broadcast channel (PBCH), or the receiver receives the uplink signal by using a spatial domain transmission filter the same as that of transmitting a synchronization signal (SS).

14. The apparatus according to claim 8, wherein the apparatus further comprising:
a controller configured to configure a terminal equipment with the information associated with the spatial relation for the uplink signal, the information including an item indicating a spatial relation.

15. A communication system, comprising:
a terminal device configured to transmit an uplink signal by using a spatial domain transmission filter the same as that of a received signal or a transmitted signal before receiving a configuration information associated with a spatial relation for uplink control channel and
receive the configuration information, wherein the configuration information is a list for spatial relation indication and the configuration information includes a single entry; and
a network device configured to receive the uplink signal.

* * * * *